Patented July 11, 1933

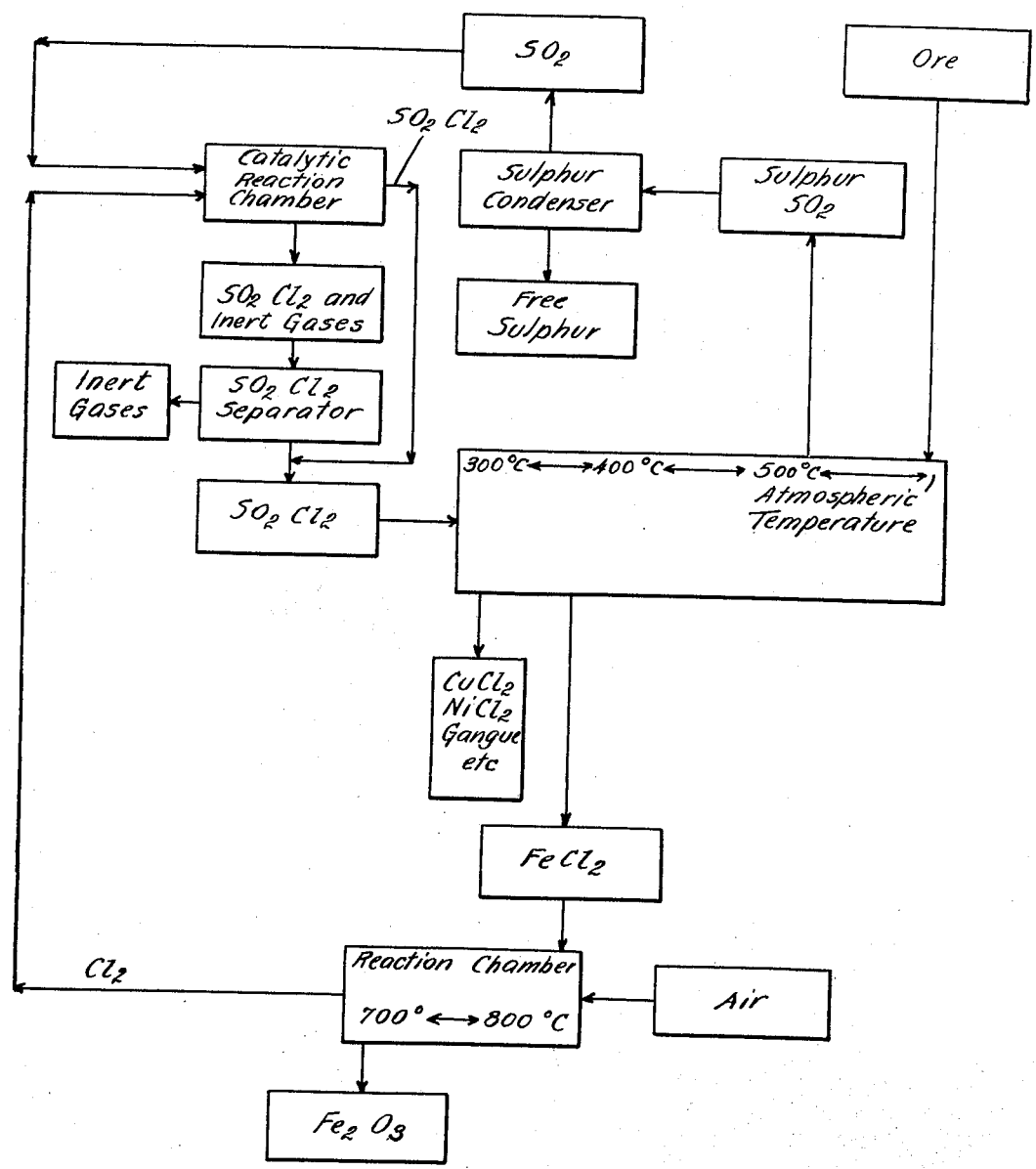

1,917,233

UNITED STATES PATENT OFFICE

RAYMOND F. BACON, OF BRONXVILLE, AND HENRY T. HOTCHKISS, JR., OF NEW ROCHELLE, NEW YORK; SAID HOTCHKISS, JR., ASSIGNOR TO SAID BACON

TREATMENT OF IRON SULPHIDE-BEARING MATERIAL

Application filed February 26, 1930. Serial No. 431,472.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals such, for example, as copper and nickel, with sulphuryl chloride for the purpose of obtaining free sulphur and/or separating iron from the mass of material undergoing treatment.

In carrying out a process in accordance with the present invention, a quantity of the material to be treated is subjected to the action of sulphuryl chloride under such conditions that free sulphur and ferric chloride are produced and vaporized. The vaporized sulphur is collected and the free chloride is utilized for treating additional quantities of sulphide-bearing material to produce a product in which ferrous chloride is concentrated. The ferrous chloride concentrate is appropriately treated to recover chlorine which is returned to the process.

The process may be conveniently conducted by passing the sulphide-bearing material progressively through reaction zones of different temperatures. According to the preferred process of the invention, the iron sulphide-bearing material is first introduced into a reaction zone of relatively high temperature and passed progressively through reaction zones of lower temperatures. The process is so controlled that ferrous chloride is produced in the high temperature reaction zones and ferric chloride is produced in the lower temperature reaction zones. Elemental sulphur is produced and vaporized and the ferric chloride produced is vaporized. The vaporized sulphur and ferric chloride are caused to pass over fresh or partially converted sulphide-bearing material in the higher temperature reaction zones, the sulphur vapor ultimately being collected as free sulphur, and the ferric chloride reacting with sulphide compounds and being reduced to ferrous chloride.

During the course of the reaction between the sulphuryl chloride and the sulphides contained in the material being treated, sulphur dioxide gas is formed and passes out of the reaction chamber with the vaporized sulphur. The recovered chlorine is combined with the sulphur dioxide produced to regenerate sulphuryl chloride which is returned to the process.

The process may be carried out in any suitable type of apparatus, but it is preferably carried out in a rotary reaction chamber in which a suitable temperature gradient is maintained and into which the sulphuryl chloride and iron sulphide-bearing material are introduced at appropriate points.

The invention will be better understood from a consideration of the accompanying flowsheet and the following description of a process involving the treatment of ore containing pyrites and sulphides of copper and nickel.

The ore to be treated is introduced in a dry, finely divided condition into the interior of a rotary reaction chamber having charging means at one end and discharging means at the other end. An opening or passage to permit the outward passage of sulphur vapors and other gases is provided near the charging end.

The reaction between the sulphuryl chloride and heavy metal sulphides starts at a temperature of about 250° C. and proceeds most rapidly at a temperature of about 500° C. to 550° C. It is, therefore, advisable to maintain a temperature of about 500° C. to 550° C. in at least a portion of the reaction chamber. Such a temperature may be maintained near the charging end portion of the reaction chamber to insure the passage of all issuing gases through a zone in which conditions are conducive to a complete reaction.

The temperature within the reaction chamber is preferably so regulated that it gradually increases from the normal atmospheric temperature at the charging end to a maximum temperature of about 550° C at a point about midway between the charging end and the longitudinal center of the reaction chamber, and gradually decreases from the region of maximum temperature to about 300° C. at the discharge end. The opening or passage for sulphur vapors is preferably located at a point between the charging end of the chamber and the region of maximum temperature where the temperature within the chamber is about 450° C. or slightly lower.

The ore, preferably ground to provide particles sufficiently small to pass a 100-mesh screen in order that intimate contact of the sulphuryl chloride with the sulphide compounds may be obtained, is introduced into the reaction chamber at the charging end. Sulphuryl chloride is introduced into the reaction chamber at the discharge end. The sulphuryl chloride may be introduced into the reaction chamber as a liquid or as a gas. Liquid sulphuryl chloride will be vaporized immediately after its introduction.

The process is conducted as a batch process, the discharge end of the chamber being closed. The ore may be fed to the chamber continuously until the desired concentration has been effected, or the ore may be fed to the reaction chamber until a predetermined amount has been introduced.

When ore is first introduced into the reaction chamber, no sulphuryl chloride is introduced until the ore reaches or passes the zone of maximum temperature. As the ore reaches the zone of maximum temperature, the sulphuryl chloride may be admitted, slowly at first, and in gradually increasing amounts as the ore and chlorinated material progress through the chamber. Sulphuryl chloride may be admitted at any desired maximum rate. The rate at which sulphuryl chloride is admitted and the amount of sulphuryl chloride admitted will be determined by the rate of feeding of ore into the reaction zones and the amount of ore to be treated.

During the course of the process, the sulphuryl chloride first reacts with the sulphides of iron, copper and nickel to produce sulphur dioxide, free sulphur, ferrous chloride and the chlorides of copper and nickel. The free sulphur is vaporized and passes out of the reaction chamber with the sulphur dioxide to suitable collecting and condensing apparatus. As the reaction chamber is rotated, the ferrous chloride-bearing material moves gradually toward the discharge end and fresh ore is moved into the zone of maximum temperature. As the ferrous chloride-bearing material moves toward the discharge end the sulphuryl chloride reacts with the ferrous chloride and oxidizes it to ferric chloride. The ferric chloride produced is vaporized and the resulting vapor is swept along with the sulphuryl chloride toward the zone of maximum temperature. The ferric chloride comes into contact with fresh or partially chlorinated sulphide-bearing material and is reduced to ferrous chloride.

The chlorination process is so conducted and controlled that iron compounds are substantially completely eliminated from the material in the discharge end portion of the reaction chamber and ferrous chloride is concentrated in the adjoining portion of the reaction chamber. The material in the discharge end portion of the reaction chamber will consist substantially entirely of nickel and copper chlorides and gangue materials which may be present in the original ore.

When the ore is fed continuously during the course of a process, the admission of ore and sulphuryl chloride may be discontinued when the presence of considerable ferric chloride in the issuing sulphur vapor indicates that insufficient fresh ore is being moved into the reaction zones to react with the ferric chloride produced, or when the operations have been conducted for a predetermined length of time.

When the ore is fed to the reaction chamber only until a predetermined amount has been admitted, the admission of sulphuryl chloride may be discontinued when the last portion of the ore reaches the zone of maximum temperature. The process may be so conducted that satisfactory concentration will have been effected at that time.

In the case of continuous feeding, at the completion of the chlorination treatment, the iron-free material containing chlorides of copper and nickel will be segregated in the discharge end portion of the chamber, fresh or substantially unaltered ore will be present in the portion of the reaction chamber between the charging end and the zone of maximum temperature, and the ferrous chloride-bearing material will be concentrated in the intermediate portion of the reaction chamber.

Upon the completion of a chlorination process involving the admission of a predetermined amount of ore, the iron-free material will be segregated in the discharge end portion of the reaction chamber, and the ferrous chloride-bearing material will be concentrated in the adjoining portion of the chamber. The charging end portion of the chamber will be empty.

When the admission of sulphuryl chloride has been discontinued, the discharge end of the reaction chamber may be opened. Rotation of the reaction chamber will cause the contents to be discharged. The iron-free material containing chlorides of copper and nickel is discharged and collected first, and while the iron-free material is being discharged the ferrous chloride concentrate is being moved toward the discharge end. After the iron-free material has been discharged and collected, the ferrous chloride concentrate is discharged and collected separately.

When the ferrous chloride concentrate has been discharged, treatment of a fresh batch of ore is commenced.

The ferrous chloride concentrate is subjected to the action of air at a temperature of 700° C. to 800° C. to recover chlorine. The treatment of the ferrous chloride concentrate is preferably so conducted that free chlorine is produced.

The chlorine recovered is combined with the sulphur dioxide produced to regenerate sulphuryl chloride. The reaction between the sulphur dioxide and the free chlorine is preferably conducted at or below normal atmospheric temperatures in the presence of a suitable catalyst such, for example, as activated charcoal. The regenerated sulphuryl chloride may thus be obtained in the form of a liquid. The regenerated sulphuryl chloride is utilized for the treatment of the fresh batch of ore.

As a result of the treatment of the ferrous chloride-bearing material with air, considerable quantities of inert gases such as nitrogen are introduced into the system and must be eliminated to avoid excessive dilution. The inert gases introduced into the system will be mixed with the chlorine gas which is recovered and which is combined with the sulphur dioxide produced to regenerate sulphuryl chloride. These gases will be eliminated as a result of the production of liquid sulphuryl chloride. The inert gases may be passed through a suitable separator to recover entrained particles or globules of sulphuryl chloride.

The treatment of a batch of ore with sulphuryl chloride and the treatment of a ferrous chloride-bearing residue for the recovery of chlorine are preferably conducted simultaneously in order that the sulphur dioxide and chlorine produced may be utilized immediately. A fresh source of chlorine, in the free state or combined in the form of sulphuryl chloride, may be provided to compensate for chlorine losses due to leakage and the production of nickel and copper chlorides. In the event that a source of free chlorine is provided, an additional source of sulphur dioxide must be provided.

We claim:

1. In a process for treating iron sulphide-bearing material involving the treatment of the material in the presence of a chlorinating agent, the improvement which comprises subjecting the material to progressively decreasing temperatures in the presence of sulphuryl chloride.

2. The method of treating iron sulphide-bearing material which comprises subjecting the material in a reaction chamber to the action of sulphuryl chloride to produce ferrous chloride, oxidizing the ferrous chloride to recover chlorine, converting the chlorine to sulphuryl chloride, and returning the sulphuryl chloride thus recovered to the process.

3. The method of treating iron sulphide-bearing material which comprises subjecting the material in a reaction chamber to the action of sulphuryl chloride to produce ferrous chloride, sulphur dioxide and elemental sulphur, subjecting the ferrous chloride to the action of air at an elevated temperature to recover chlorine, combining the chlorine recovered with the sulphur dioxide produced to regenerate sulphuryl chloride, and returning the sulphuryl chloride thus recovered to the process.

4. The method of treating ore containing sulphides of iron and copper which comprises subjecting the ore to the action of sulphuryl chloride at an elevated temperature to form and vaporize ferric chloride and obtain a substantially iron-free product containing copper chloride and elemental sulphur.

5. The method of treating ore containing pyrites and a non-ferrous metal sulphide which comprises subjecting the ore to the action of sulphuryl chloride to form and vaporize ferric chloride and elemental sulphur and obtain a substantially iron-free product containing a non-ferrous metal chloride.

6. The method of treating ore containing pyrites and sulphides of copper and nickel which comprises subjecting the ore to the action of sulphuryl chloride to form and vaporize ferric chloride and elemental sulphur and obtain a substantially iron-free product containing copper and nickel chlorides.

7. The method of treating iron sulphide-bearing material which comprises subjecting one portion of the material in a reaction chamber to the action of sulphuryl chloride to produce ferrous chloride, sulphur dioxide and elemental sulphur, chlorinating the ferrous chloride to ferric chloride while maintaining a temperature suitable to vaporize the ferric chloride, contacting the ferric chloride so produced with another portion of said material in the chamber to chlorinate the same and form a ferrous chloride concentrate, oxidizing the ferrous chloride concentrate to recover chlorine, combining the chlorine recovered with the sulphur dioxide produced to regenerate sulphuryl chloride, and returning the regenerated sulphuryl chloride to the process.

8. In a process for treating iron sulphide-bearing material involving the treatment of the material with a chlorinating agent, the step which comprises contacting the material with sulphuryl chloride.

In testimony whereof we affix our signatures.

RAYMOND F. BACON.
HENRY T. HOTCHKISS, Jr.